(12) United States Patent
Gonyou

(10) Patent No.: US 9,371,064 B2
(45) Date of Patent: Jun. 21, 2016

(54) POSITION SENSING ASSEMBLY FOR USE WITH A VEHICLE HYDRAULIC MASTER CYLINDER OF A VEHICLE BRAKING SYSTEM WITH MASTER CYLINDER ASSEMBLY INCLUDING SUCH A POSITION SENSING ASSEMBLY

(75) Inventor: Jeremiah Gonyou, Northville, MI (US)

(73) Assignee: Kelsey-Hayes Company, Livonia, MI (US)

( * ) Notice: Subject to any disclaimer, the term of this patent is extended or adjusted under 35 U.S.C. 154(b) by 719 days.

(21) Appl. No.: 13/807,357

(22) PCT Filed: Jun. 30, 2011

(86) PCT No.: PCT/US2011/042523
§ 371 (c)(1),
(2), (4) Date: Mar. 13, 2013

(87) PCT Pub. No.: WO2012/003273
PCT Pub. Date: Jan. 5, 2012

(65) Prior Publication Data
US 2013/0199174 A1    Aug. 8, 2013

Related U.S. Application Data

(60) Provisional application No. 61/359,863, filed on Jun. 30, 2010.

(51) Int. Cl.
| | | |
|---|---|---|
| B60T 17/22 | (2006.01) | |
| B60T 7/04 | (2006.01) | |
| B60T 7/08 | (2006.01) | |
| B60T 11/16 | (2006.01) | |
| F15B 15/28 | (2006.01) | |
| G01B 7/00 | (2006.01) | |
| G01B 7/14 | (2006.01) | |

(52) U.S. Cl.
CPC ............ *B60T 17/22* (2013.01); *B60T 7/042* (2013.01); *B60T 7/085* (2013.01); *B60T 11/16* (2013.01); *F15B 15/2861* (2013.01); *G01B 7/003* (2013.01); *G01B 7/14* (2013.01)

(58) Field of Classification Search
CPC ...... B60T 7/085; B60T 17/22; F15B 1/28615
USPC .......................................................... 60/654
See application file for complete search history.

(56) References Cited

U.S. PATENT DOCUMENTS

| | | | |
|---|---|---|---|
| 6,619,039 B2 | 9/2003 | Zehnder, II et al. | |
| 6,951,104 B2 * | 10/2005 | Stobrawe et al. | ............... 60/534 |
| 7,018,002 B2 | 3/2006 | Masson et al. | |
| 7,170,278 B2 * | 1/2007 | Wohner | ................... 324/207.24 |
| 2005/0012500 A1 * | 1/2005 | Braun et al. | ............. 324/207.24 |

* cited by examiner

*Primary Examiner* — Nathaniel Wiehe
*Assistant Examiner* — Daniel Collins
(74) *Attorney, Agent, or Firm* — MacMillan, Sobanski & Todd, LLC

(57) ABSTRACT

A position sensing assembly adapted for use with a master cylinder to measure travel of a piston of the master cylinder via a magnet operatively coupled to the piston thereof for movement therewith between a zero brake apply position and a full brake apply position. According to one embodiment, the position sensing assembly includes a housing adapted to be attached to a master cylinder housing and a flux concentrator operatively disposed with the position sensing assembly housing. The flux concentrator includes a first end, an intermediate body, and a second end. At least one of the first end and the second end defines a longitudinal plane and at least a portion of the intermediate body is oriented at an angle relative to the longitudinal plane whereby the position sensing assembly is adapted to measure the travel of the piston of the master cylinder via the magnet.

17 Claims, 5 Drawing Sheets

POSITION SENSING ASSEMBLY FOR USE WITH A VEHICLE HYDRAULIC MASTER CYLINDER OF A VEHICLE BRAKING SYSTEM WITH MASTER CYLINDER ASSEMBLY INCLUDING SUCH A POSITION SENSING ASSEMBLY

BACKGROUND OF THE INVENTION

This invention relates in general to vehicle braking systems and in particular to a position sensing assembly adapted for use with a hydraulic master cylinder of such a vehicle braking system and a master cylinder assembly including such a position sensing assembly.

A position sensing assembly is well known in the art in connection with a hydraulic master cylinder of a vehicle braking system for the purpose of detecting the actuation of the vehicle braking system or for other related vehicle brake system detection and/or operating purposes. Examples of know position sensing assemblies are shown in U.S. Pat. No. 7,018,002 to Masson et al., U.S. Pat. No. 6,951,104 to Stobrawe et al., and U.S. Pat. No. 6,619,039 to Zehnder, II et al.

SUMMARY OF THE INVENTION

This invention relates to a position sensing assembly particularly adapted for use with a hydraulic master cylinder of a vehicle braking system and a master cylinder assembly including such a position sensing assembly.

According to an embodiment, there is provided a position sensing assembly adapted for use with a master cylinder to measure travel of a piston of the master cylinder via a magnet operatively coupled to the piston thereof for movement therewith between a zero brake apply position and a full brake apply position. In this embodiment, the position sensing assembly includes a housing adapted to be attached to a master cylinder housing and a flux concentrator operatively disposed with the position sensing assembly housing. The flux concentrator includes a first end, an intermediate body, and a second end. At least one of the first end and the second end defines a longitudinal plane and at least a portion of the intermediate body is oriented at an angle relative to the longitudinal plane whereby the position sensing assembly is adapted to measure the travel of the piston of the master cylinder via the magnet.

According to a feature of the position sensing assembly, the flux concentrator can be formed as part of the housing of the position sensing assembly during an overmolding process.

According to another feature of the position sensing assembly, the housing of the position sensing assembly can further include at least one Hall effect IC operatively disposed therein.

According to yet another feature of the position sensing assembly, the flux concentrator and the at least one Hall effect IC can be secured within the housing during the overmolding process.

According to still a further feature of the position sensing assembly, the housing of the position sensing assembly can further include a terminal lead frame operatively disposed therein, and the flux concentrator, the at least one Hall effect IC and the terminal lead frame cover can be formed as part of the housing of the position sensing assembly during an overmolding process.

According to another feature of the position sensing assembly, at least one of the first end and the second end of the flux concentrator can define a longitudinal plane, and the intermediate body of the flux concentrator can be oriented at an angle relative to the longitudinal plane.

According to still a further feature of the position sensing assembly, the first end can define a first longitudinal plane and the second end can define a second longitudinal plane which is generally parallel to the first longitudinal plane but offset relative thereto, and the intermediate body of the flux concentrator can be oriented at an angle relative to the first longitudinal plane.

According to yet a further feature of the position sensing assembly, the intermediate body of the flux concentrator can be wholly oriented at an angle relative to the longitudinal plane extending from the first end to the second end thereof.

According to an embodiment, there is provided a master cylinder assembly having a housing and a piston operatively disposed therein and adapted to move between a zero brake apply position and a full brake apply position. The piston has a magnet operatively coupled thereto for movement therewith and the magnet defines a longitudinal plane. There is also provided a position sensing assembly having a housing adapted for attaching the position sensing assembly to the housing of the master cylinder. The housing of the position sensing assembly includes a flux concentrator operatively disposed therein. The flux concentrator includes a first end, an intermediate body, and a second end. At least a portion of the intermediate body is oriented at an angle with respect to the longitudinal plane defined by the magnet whereby the position sensing assembly is adapted to measure the travel of the piston of the master cylinder via the magnet.

According to a feature of the master cylinder assembly, the magnet can be either directly coupled to the piston or can be indirectly coupled to the piston.

According to another feature of the master cylinder assembly, the flux concentrator can be formed as part of the housing of the position sensing assembly during an overmolding process.

According to yet another feature of the master cylinder assembly, the housing of the position sensing assembly can further include at least one Hall effect IC operatively disposed therein.

According to still yet another feature of the master cylinder assembly, the flux concentrator and the at least one Hall effect IC can be secured within the housing during the overmolding process.

According to another feature of the master cylinder assembly, the housing of the position sensing assembly can further include a terminal lead frame operatively disposed therein and the flux concentrator, the at least one Hall effect IC and the terminal lead frame cover can be formed as part of the housing of the position sensing assembly during an overmolding process.

According to still a further feature of the master cylinder sensing assembly, the first end defines a first longitudinal plane and the second end defines a second longitudinal plane which is offset relative to first longitudinal plane, and the first and second longitudinal planes are generally parallel to the longitudinal plane defined by the magnet.

According to still a further feature of the master cylinder assembly, the intermediate body of the flux concentrator can be wholly oriented at an angle relative to the longitudinal plane defined by the magnet.

According to another embodiment, there is provided a master cylinder assembly having a housing and a piston operatively disposed therein and adapted to move between a zero brake apply position and a full brake apply position. The piston has a magnet operatively coupled thereto for movement therewith, the magnet defining a longitudinal plane.

There is also provided a position sensing assembly having a housing adapted for attaching the position sensing assembly to the housing of the master cylinder. The housing of the position sensing assembly includes a flux concentrator and at least one Hall effect IC operatively disposed therein during an overmolding process. The flux concentrator includes a first end, an intermediate body, and a second end. At least a portion of the intermediate body is oriented at an angle with respect to the longitudinal plane defined by the magnet whereby the position sensing assembly is adapted to measure the travel of the piston of the master cylinder via the magnet.

According to a feature of this embodiment of the master cylinder assembly, the housing of the position sensing assembly can further include a terminal lead frame operatively disposed therein during the overmolding process.

According to another feature of this embodiment of the master cylinder assembly, the magnet can be directly coupled to the piston.

Also, while the present invention will be illustrated and described in connection preferably with the particular vehicle system or apparatus disclosed herein, it will be appreciated that the invention can be used in connection with other suitable desired vehicle systems or apparatus.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
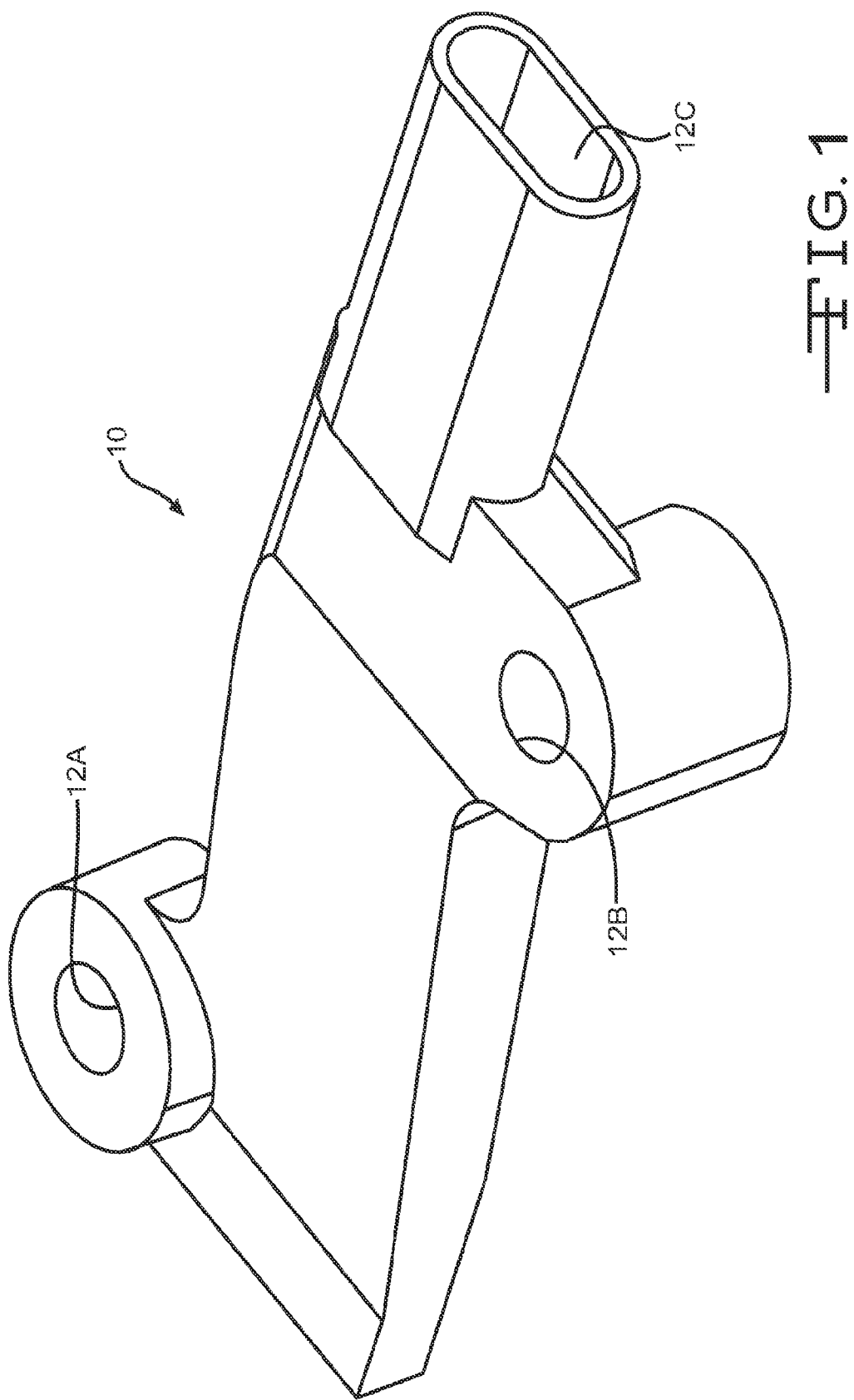
FIG. 1 is a perspective view of an embodiment of a position sensing assembly constructed in accordance with this invention adapted for use with a hydraulic master cylinder of a vehicle braking system.
Figure 2:
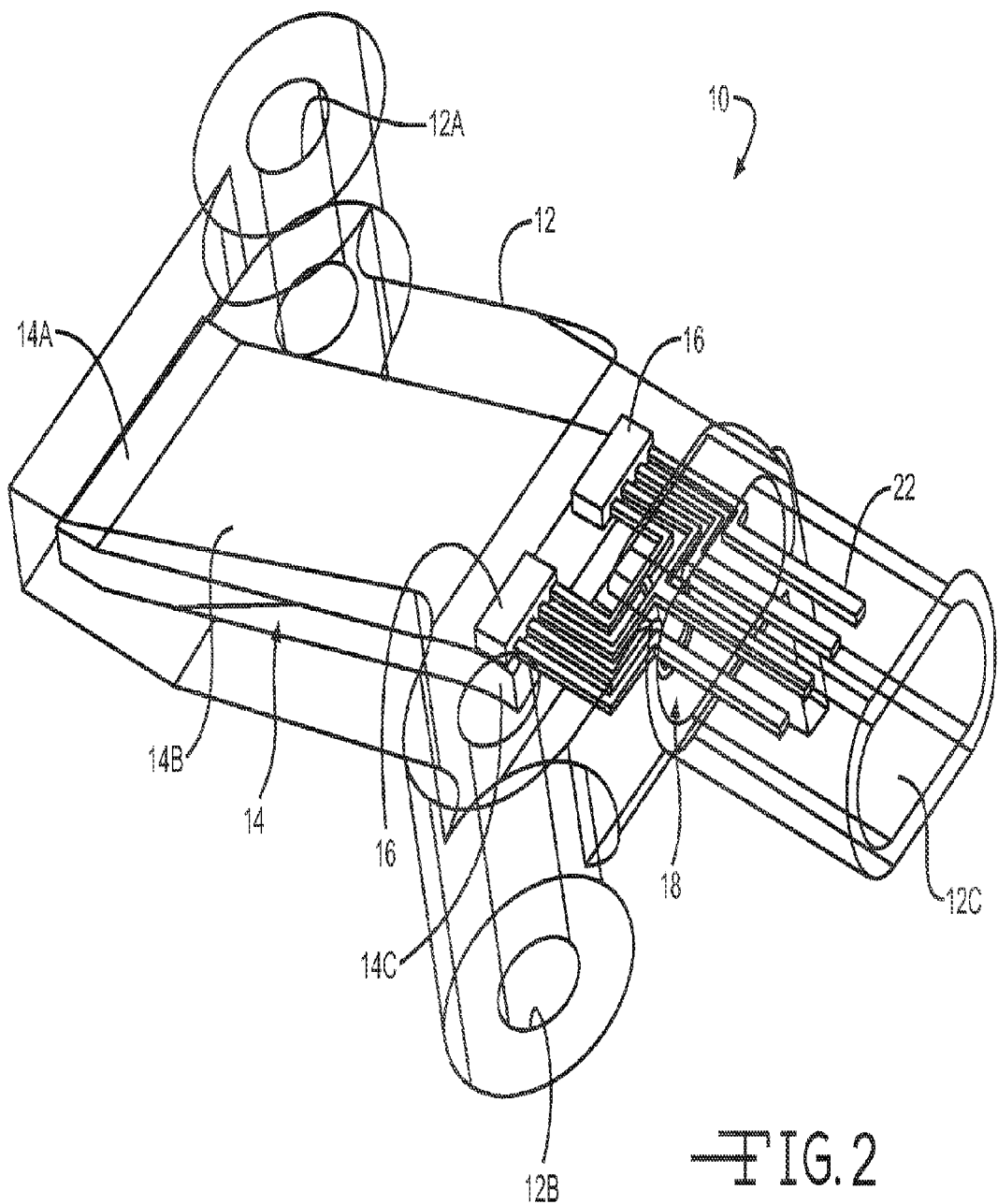
FIG. 2 is a perspective see-through view of the embodiment of the position sensing assembly illustrated in FIG. 1.

Referring now to FIGS. 1 and 2, there is illustrated an embodiment of a position sensing assembly, indicated generally at 10, constructed in accordance with this invention adapted for use preferably with a hydraulic master cylinder of a vehicle braking system. As best shown in one or more of FIGS. 1 through 3, the illustrated embodiment of the position sensing assembly includes a housing 12, an "angled" flux concentrator 14, a pair of linear Hall effect IC's 16, and a terminal lead frame 18 (or alternatively a printed circuit board (PCB) (not shown)), with connector terminals 22.

Figure 3:
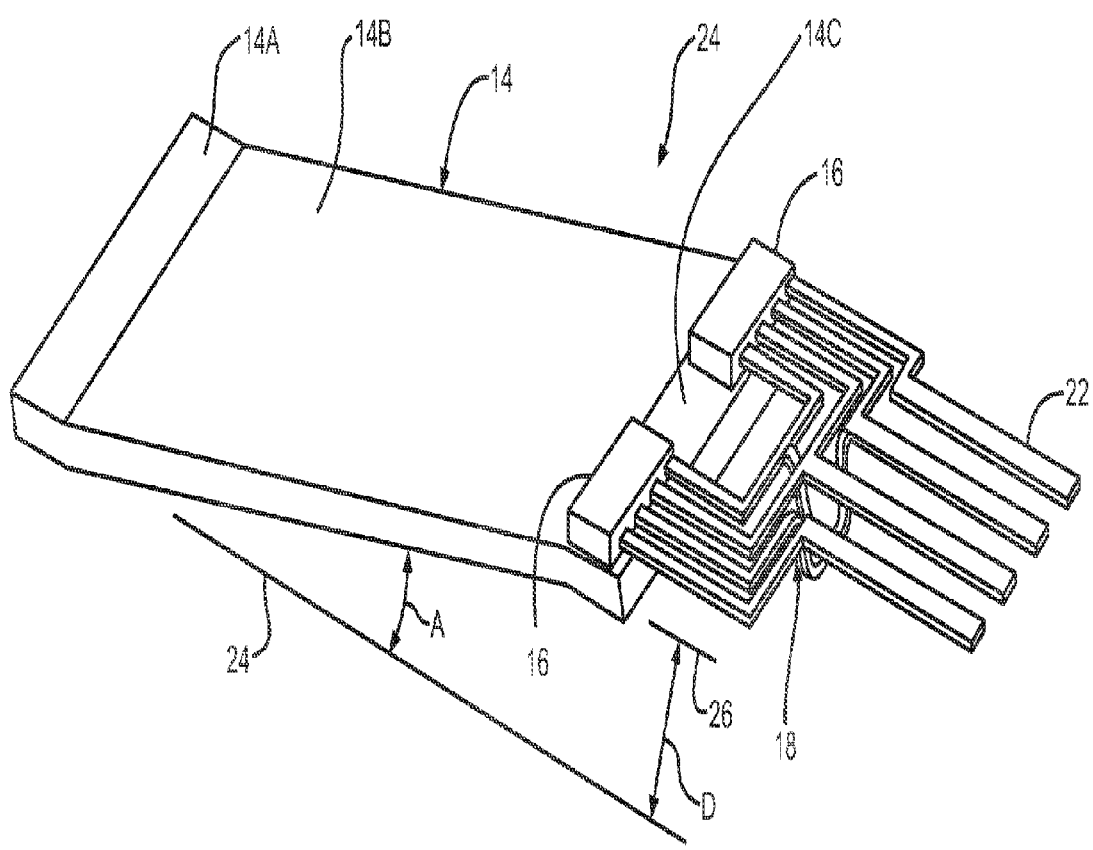
FIG. 3 is a perspective view of a portion of the position sensing assembly illustrated in FIGS. 1 and 2.

In the illustrated embodiment as best shown in FIG. 3, the pair of Hall effect IC's 16 are operatively secured to the flux concentrator 14 by suitable means. For example, the pair of Hall effect IC's 16 can be operatively connected or secured to the flux concentrator 14 by an epoxy or by a plastic overmold, for example, if so desired. The terminal lead frame 18 is operatively connected or secured to the pair of Hall effect IC's 16 by suitable means. For example, the terminal lead frame 18 can be operatively connected to the pair of Hall effect IC's by soldering or by welding, for example, if so desired. The "assembled" flux concentrator 14, pair of Hall effect IC's 16 and the terminal lead frame 18 forms or produces a flux concentrator assembly, indicated generally at 24 in FIG. 3.

In the illustrated embodiment, the housing 12 is preferably overmolded in situ with the flux concentrator assembly 24 to produce a finished overmolded position sensing assembly 10. To assist in this, in the illustrated embodiment the housing 12 is formed from a suitable material which can be utilized in a suitable molding process, such as plastic which can be utilized in an injection plastic molding process or other suitable molding process.

As best shown for example in FIG. 3, in the illustrated embodiment the flux concentrator 14 preferably includes a first end or leg 14A, an intermediate body 14B, and a second opposite end or leg 14C. In the illustrated embodiment the first leg 14A defines a first "longitudinal" plane 24 and the second leg 14C defines a second "longitudinal" plane 26 which is generally parallel to the first plane 24 but offset relative thereto a predetermined distance D. Also, in the illustrated embodiment, the intermediate body 14B of the flux concentrator 14 is preferably oriented at an angle A relative to the first plane 24. The angle A can be in the range of from generally about 1 degree to generally about 45 degrees. More preferably, the angle can be in the range of from generally about 5 degrees to generally about 20 degrees. However, as can be understood, the angle A of the flux concentrator 14 will be dependent upon the particular size and stroke of the associated master cylinder on which the position sensing assembly 10 is utilized therewith.

As shown in FIGS. 1 and 2, in the illustrated embodiment, the housing 12 preferably includes a pair of mounting holes or features 12A and 12B and a connector 12C. The mounting holes 12A and 12B are adapted to receive suitable fasteners, such as screws or heat stakes (not shown), for example, for securing or attaching the position sensing assembly 10 to a master cylinder 30, which is shown schematically in FIG. 4. The connector 12C is provided for communication of the position sensing assembly 10 to a suitable external device, such as for example, including but not limited to an electronic braking control module, a vehicle control module, or a vehicle network bus. Alternatively, the construction, design, material(s), and/or configuration of the position sensing assembly 10, including the housing 12 and/or one or more parts of the flux concentrator assembly 24, including the flux concentrator 14, can be other than illustrated and described if so desired.

Figure 4:
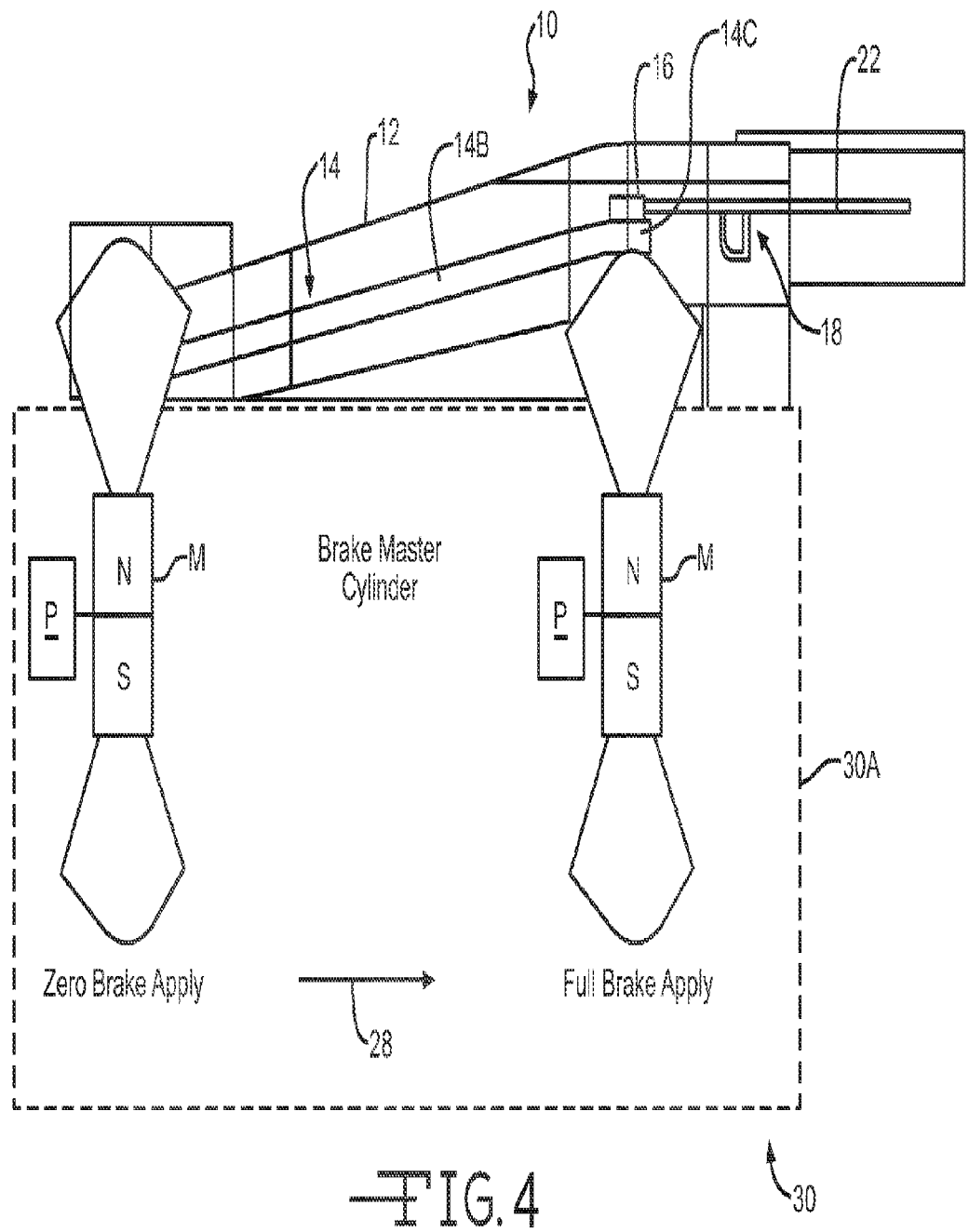
FIG. 4 is a partial schematic diagram of an embodiment of a hydraulic master cylinder of a vehicle braking system including the embodiment of the position sensing assembly illustrated in FIGS. 1-3.

As shown in FIG. 4, the operation of the position sensing assembly 10 is as follows. With the position sensing assembly 10 attached to a housing of the master cylinder 30 in a predetermined position and/or location thereon, the angled flux concentrator 14 of the position sensing assembly 10 is adapted to enable a magnetic field to work through the master cylinder housing and be read or communicated to the position sensing assembly 10 to identify the position of a piston of the master cylinder, as will be discussed below.

As shown in FIG. 4, at a zero brake apply position as shown on the left side of the drawing, the first leg 14A (not shown) of the angled flux concentrator 14 of the position sensing assembly 10 would be located nearest to a magnetic field produced by a magnet M (which is operatively coupled to a piston P of the master cylinder 30 for movement therewith), and therefore would see a maximum magnetic field. When the magnet M moves to the left in the drawing in the direction of arrow 28 to a full brake apply position as shown on the right side of the drawing, the second leg 14C (partially shown), of the angled flux concentrator 14 of the position sensing assembly 10 would be located farthest from the magnetic field produced by the magnet M and would therefore see a minimum magnetic field. Preferably, the housing 30A of the master cylinder 30 is formed from aluminum or other similar materials to enable the magnetic field produced by the magnet M to work or be transmitted through the housing 30A of the associated master cylinder 30 and to the position sensing assembly 10.

Figure 5:
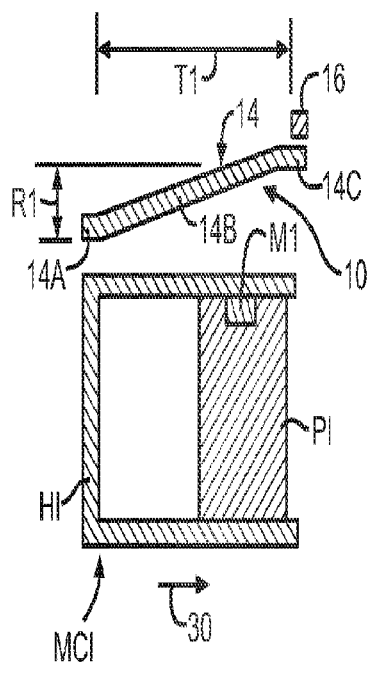
FIG. 5 is a partial schematic diagram of the embodiment of the position sensing assembly illustrated in FIGS. 1-3 with a first embodiment of a hydraulic master cylinder adapted for use therewith in accordance with invention.

Referring now to FIG. 5, there is schematically shown a first embodiment of a master cylinder assembly, including the position sensing assembly 10. As shown therein, in this embodiment a piston P1 is disposed in an associated housing H1 of a master cylinder MC1 of the assembly. In this embodiment, the piston P1 includes a magnet M1 attached or coupled thereto in a "direct" manner, such as by embedding the magnet M1 in the piston P1 by suitable means, such as for example by overmolding. Also shown schematically in FIG. 5 is the angled flux concentrator 14 of the position sensing assembly and one of the pair of Hall effect IC's 16. In operation, as the piston P1 and magnet M1 both travel in the direction of arrow 30 from a left hand side of the housing H1 of the master cylinder MC1 in FIG. 5 (i.e., the non-illustrated zero brake apply position), to a right hand side of the housing H1 of the master cylinder MC1 in FIG. 5 (i.e., the illustrated full brake apply position), the angled flux concentrator 14 converts the flux density over cylinder travel T1 into a usable range R1 to identify the entire working stroke travel of the piston P1 of the master cylinder MC1. Alternatively, the construction of the master cylinder MC1, including the piston P1 and/or the magnet M1 can be other than illustrated if so desired.

Figure 6:
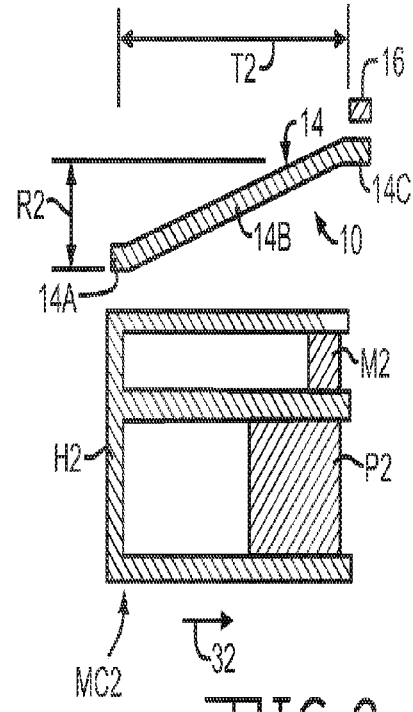
FIG. 6 is a partial schematic diagram of the embodiment of the position sensing assembly illustrated in FIGS. 1-3 with a second embodiment of a hydraulic master cylinder adapted for use therewith in accordance with this invention.

Referring now to FIG. 6, there is schematically shown a second embodiment of a master cylinder assembly, including the position sensing assembly 10. As shown therein, in this embodiment a piston P2 is disposed in an associated housing H2 of a master cylinder MC2 of the assembly. In this embodiment, the piston P2 includes a magnet M2 operatively attached or coupled thereto in a "non-direct" manner by suitable means, such as for example, by a separate push rod or external linkage (not shown). Also shown schematically in FIG. 6 is the angled flux concentrator 14 of the position sensing assembly and one of the pair of Hall effect IC's 16. In operation, as the piston P2 and magnet M2 both travel in the direction of arrow 32 from a left hand side of the housing H2 of the master cylinder MC2 in FIG. 6 (i.e., the non-illustrated zero brake apply position), to a right hand side of the housing H2 of the master cylinder MC2 in FIG. 6 (i.e., the illustrated full brake apply position), the angled flux concentrator converts 14 the flux density over cylinder travel T2 into a usable range R2 to identify the entire working stroke travel of the piston P2 of the master cylinder MC2. Alternatively, the construction of the master cylinder MC2, including the piston P2 and/or the magnet M2 can be other than illustrated if so desired.

Figure 7:
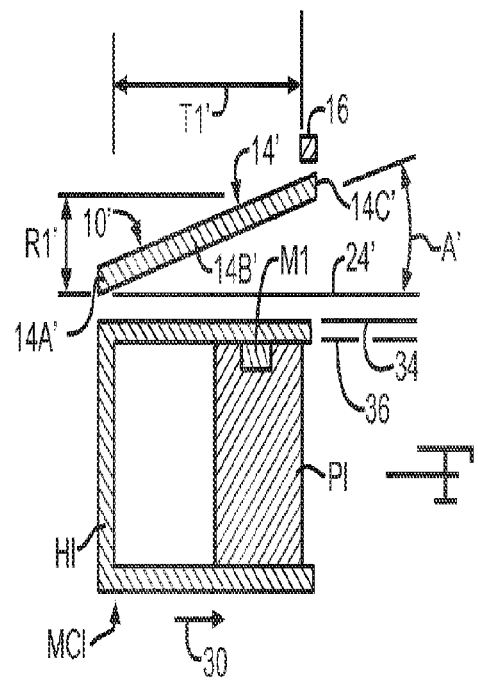
FIG. 7 is a partial schematic diagram similar to FIG. 5 showing an alternate embodiment of the position sensing assembly.

Referring now to FIG. 7 and using like reference numbers to indicate corresponding parts, there is illustrated an alternate embodiment of a position sensing assembly, indicated generally at 10', which is similar to that illustrated in connection with the master cylinder assembly of FIG. 5, except for the construction of the associated flux concentrator thereof. In this embodiment, a flux concentrator 14' is provided which has a configuration that is entirely angled throughout a body 14B' thereof extending from a first end 14A' to a second end 14C' thereof. Alternatively, one of the ends 14A' or 14C' of the flux concentrator 14' could be formed to include an end similar to that of the ends 14A or 14C of the flux concentrator 14 if so desired. Also, as can be seen in this embodiment, the intermediate body 14B' is oriented at an angle A' relative to a longitudinal plane 24' defined by the first end 14A' of the flux concentrator 14' (and/or alternatively relative to a longitudinal plane 34 defined by an associated surface and/or portion of the housing H1 of the master cylinder MC1 and/or alternatively relative to a longitudinal plane 36 defined by an associated surface and/or portion of the magnet M1).

One advantage of the present invention is that since the flux concentrator includes at least a portion of the intermediate body thereof which is oriented at an angle with respect to a longitudinal plane of an associated component of the position sensing assembly and/or master cylinder, it is operative to sense the range of movement of the piston of the associated master cylinder into a range that is usable for the entire stroke of the piston. Also, the position sensing assembly 10 is located external to the housing of the associated master cylinder and is operative to sense the magnetic field through such housing. As a result of this, the "sensitive" electronic components of the position sensing assembly 10 are kept out of or from contact with the associated hydraulic fluid typically contained within the housing of the associated master cylinder.

The position sensing assembly of the present invention can be used in connection with any desired braking system or apparatus, in which the linear position or input travel of a piston of an associated master cylinder, and therefore the position or input travel of the associated brake pedal which is operatively connected to the master cylinder for control thereof, is desired to be accurately known or measured. For example, the position sensing assembly of the present invention can be used to measure the linear displacement of an associated component in connection with a slip control boost braking system (SCB), an active hydraulic boost system (AHB), a modular electronic stability control regenerative system (ESC-R), or other types or kinds of braking systems or apparatus if so desired.

Generally, SCB offers a fully integrated stability and brake actuation system that replaces traditional boosters, master cylinders and vacuum pumps with an electro-hydraulic control unit (EHCU), and brake pedal simulator unit with a twin master cylinder to supply brake pressure. This offers several advantages: (1) ease of installation with fewer components to fit; (2) improved packaging in the front dash area versus traditional vacuum boosters; (3) a decoupled brake pedal that is ideal for integration into autonomous or emergency braking systems; and (4) best-in-class NVH characteristics. Generally, the AHB system is compatible with any electronic stability control system (ESC) and only replaces the brake actuation system with the EHCU, pedal simulator and master cylinder solution. AHB offers the same advantages as the SCB system and provides a single slip control system trim across a full vehicle platform of conventional and hybrid vehicles. Generally, the modular ESC-R system is primarily for hybrid electric vehicles. The modular, hydraulically closed-loop system is based on a standard ESC system, but features a brake pedal simulator.

Also, the position sensing assembly of the present invention is not limited to use with a hydraulic master cylinder but can be used with any other vehicle component or system wherein the linear displacement of an associated part of such a vehicle component or system is desired to be measured or known.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A position sensing assembly, adapted for use with a master cylinder to measure travel of a piston of the master cylinder via a magnet operatively coupled to the piston thereof for movement therewith between a zero brake apply position and a full brake apply position, the position sensing assembly comprising:
    a housing formed from a suitable material, the housing adapted to be attached to a master cylinder housing; and
    a flux concentrator operatively disposed with the position sensing assembly housing, wherein the flux concentrator includes a first end, an intermediate body, and a second end, wherein at least one of the first end and the second end defines a longitudinal plane and wherein the intermediate body is wholly oriented at an angle relative to the longitudinal plane extending from the first end to the second end thereof whereby the position sensing assembly is adapted to measure the travel of the piston of the master cylinder via the magnet.

2. The position sensing assembly of claim 1 wherein the flux concentrator is formed as part of the housing of the position sensing assembly during an overmolding process.

3. The position sensing assembly of claim 1 wherein the housing of the position sensing assembly further includes at least one Hall effect IC operatively disposed therein.

4. The position sensing assembly of claim 3 wherein the flux concentrator and the at least one Hall effect IC are secured within the housing during the overmolding process.

5. The position sensing assembly of claim 3 wherein the housing of the position sensing assembly further includes a terminal lead frame operatively disposed therein and wherein the flux concentrator, the at least one Hall effect IC and the terminal lead frame cover are formed as part of the housing of the position sensing assembly during an overmolding process.

6. The position sensing assembly of claim 1 wherein the first end defines a first longitudinal plane and the second end defines a second longitudinal plane which is generally parallel to the first longitudinal plane but offset relative thereto.

7. A master cylinder assembly comprising:
    a master cylinder having a housing and a piston operatively disposed therein and adapted to move between a zero brake apply position and a full brake apply position, the piston having a magnet operatively coupled thereto for movement therewith, the magnet defining a longitudinal plane; and
    a position sensing assembly having a housing adapted for attaching the position sensing assembly to the housing of the master cylinder;
    wherein the housing of the position sensing assembly includes a flux concentrator operatively disposed therein, the flux concentrator including a first end, an intermediate body, and a second end,
    wherein the intermediate body is wholly oriented at an angle relative to the longitudinal plane defined by the magnet whereby the position sensing assembly is adapted to measure the travel of the piston of the master cylinder via the magnet.

8. The master cylinder assembly of claim 7 wherein the magnet is directly coupled to the piston.

9. The master cylinder assembly of claim 7 wherein the magnet is indirectly coupled to the piston.

10. The master cylinder assembly of claim 7 wherein the flux concentrator is formed as part of the housing of the position sensing assembly during an overmolding process.

11. The master cylinder assembly of claim 7 wherein the housing of the position sensing assembly further includes at least one Hall effect IC operatively disposed therein.

12. The master cylinder assembly of claim 11 wherein the flux concentrator and the at least one Hall effect IC are secured within the housing during the overmolding process.

13. The master cylinder assembly of claim 11 wherein the housing of the position sensing assembly further includes a terminal lead frame operatively disposed therein and wherein the flux concentrator, the at least one Hall effect IC and the terminal lead frame cover are formed as part of the housing of the position sensing assembly during an overmolding process.

14. The master cylinder sensing assembly of claim 7 wherein the first end defines a first longitudinal plane and the second end defines a second longitudinal plane which is offset relative to first longitudinal plane, and wherein the first and second longitudinal planes are generally parallel to the longitudinal plane defined by the magnet.

15. A master cylinder assembly comprising:
    a master cylinder having a housing and a piston operatively disposed therein and adapted to move between a zero brake apply position and a full brake apply position, the piston having a magnet operatively coupled thereto for movement therewith, the magnet defining a longitudinal plane; and
    a position sensing assembly having a housing adapted for attaching the position sensing assembly to the housing of the master cylinder;
    wherein the housing of the position sensing assembly includes a flux concentrator and at least one Hall effect IC operatively disposed therein during an overmolding process, the flux concentrator including a first end, an intermediate body, and a second end, wherein the intermediate body is wholly oriented at an angle with respect to the longitudinal plane defined by the magnet whereby the position sensing assembly is adapted to measure the travel of the piston of the master cylinder via the magnet.

16. The master cylinder assembly of claim 15 wherein the housing of the position sensing assembly further includes a terminal lead frame operatively disposed therein during the overmolding process.

17. The master cylinder assembly of claim 15 wherein the magnet is directly coupled to the piston.

\* \* \* \* \*